US009944130B2

(12) United States Patent
Madrid

(10) Patent No.: US 9,944,130 B2
(45) **Date of Patent: *Apr. 17, 2018**

(54) TIRE HAVING GROOVES COMPRISING SIPES AND/OR OTHER CROSS-GROOVE NEGATIVE GEOMETRY

(71) Applicant: Bridgestone Americas Tire Operations, LLC, Nashville, TN (US)

(72) Inventor: Ruben Lorenzo Madrid, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,978

(22) Filed: Jul. 24, 2017

(65) Prior Publication Data

US 2017/0320361 A1 Nov. 9, 2017

Related U.S. Application Data

(63) Continuation of application No. 14/059,516, filed on Oct. 22, 2013, now Pat. No. 9,731,561.

(51) Int. Cl.

*B60C 11/00* (2006.01)
*B60C 11/13* (2006.01)
*B60C 11/12* (2006.01)

(52) U.S. Cl.

CPC ...... *B60C 11/1353* (2013.01); *B60C 11/1204* (2013.01); *B60C 11/125* (2013.01); *B60C 2011/1213* (2013.01)

(58) Field of Classification Search

CPC ............ B60C 11/1353; B60C 11/1204; B60C 2011/1213; B60C 2011/1227; B60C 11/125

See application file for complete search history.

(56) References Cited

U.S. PATENT DOCUMENTS

| | | | |
|---|---|---|---|
| 2,268,344 | A | 12/1941 | Shesterkin |
| 3,938,572 | A | 2/1976 | Nishi et al. |
| 6,439,284 | B1 | 8/2002 | Fontaine |
| 7,954,527 | B2 | 6/2011 | Sheng et al. |
| 7,975,738 | B2 | 7/2011 | Ohki |
| 8,132,604 | B2 | 3/2012 | Ohara |
| 8,132,605 | B2 | 3/2012 | Nagai |
| 2003/0047262 | A1 | 3/2003 | Kousaie et al. |
| 2004/0118494 | A1 | 6/2004 | Liederer |
| 2004/0211501 | A1 | 10/2004 | Kajita |

(Continued)

FOREIGN PATENT DOCUMENTS

| | | | |
|---|---|---|---|
| JP | S63-297108 | A | 12/1988 |
| JP | S63-314255 | A | 12/1988 |

(Continued)

OTHER PUBLICATIONS

Bae, Geun Tae; International Search Report and Written Opinion for PCT patent application PCT/US2014/049002; Nov. 4, 2014; pp. 1-11; Korean Intellectual Property Office; Daejeon Metropolitan City, Republic of Korea.

(Continued)

*Primary Examiner* — Timothy Kennedy

(74) *Attorney, Agent, or Firm* — Shaun J. Fox; Thomas Y. Kendrick

(57) ABSTRACT

Various embodiments of a tire having grooves comprising sipes or other cross-groove negative geometry are disclosed.

16 Claims, 4 Drawing Sheets

(56) References Cited

U.S. PATENT DOCUMENTS

| | | | |
|---|---|---|---|
| 2007/0006952 | A1 | 1/2007 | Shima et al. |
| 2010/0132864 | A1 | 6/2010 | Colombo et al. |
| 2011/0061780 | A1 | 3/2011 | Mita |
| 2013/0075001 | A1 | 3/2013 | Toshikazu |
| 2013/0092303 | A1 | 4/2013 | Kleffman et al. |
| 2013/0153100 | A1 | 6/2013 | Piffard et al. |
| 2013/0160909 | A1 | 6/2013 | Atake |

FOREIGN PATENT DOCUMENTS

| | | | |
|---|---|---|---|
| JP | 2001-287511 | A | 10/2001 |
| JP | 2003-160696 | A | 6/2003 |
| JP | 2009-46052 | A | 3/2009 |
| JP | 2009067344 | A | 4/2009 |
| JP | 2009-166554 | A | 7/2009 |

OTHER PUBLICATIONS

U.S. Department of Homeland Security; What Every Member of the Trade Community Should Know About: Tires; Apr. 2014; pp. 1-28.
English machine translation of Abstract for JP2001-287511A.
English machine translation of Abstract for JPS63-297108A.
English machine translation of Abstract for JPS63-314255A.
English machine translation of Abstract for JP2009-166554A.
English machine translation of Abstract for JP2003-160696A.
Extended European Search Report, dated May 3, 2017, in European Pat. App. No. 14856388.5.
English machine translation of Abstract for JP2009067344A.
English machine translation of Abstract of JP2009-46052A.

TIRE HAVING GROOVES COMPRISING SIPES AND/OR OTHER CROSS-GROOVE NEGATIVE GEOMETRY

CROSS-REFERENCE TO RELATED APPLICATIONS

This application is a continuation application of U.S. patent application Ser. No. 14/059,516, filed Oct. 22, 2013, which is hereby incorporated by reference in its entirety.

BACKGROUND

Tires, including passenger tires, typically comprise a tread portion including a series of ribs and grooves. The ribs are often oriented to engage a driving surface and provide traction, while the grooves are often oriented to channel and evacuate water that may be present on the driving surface.

Some tires are optimized to provide increased performance in dry/wet conditions, while other tires are optimized to provide increased performance in snow/ice conditions. Additionally, some tires, typically referred to as "all-season" tires, are optimized to provide acceptable performance in both dry/wet conditions, and snow/ice conditions. However, optimization of performance across all seasons is particularly difficult in light of the very distinct mechanisms through which tire performance is increased in these varying conditions.

What is needed is a tire configured to provide increased performance in both dry/wet conditions and snow/ice conditions.

SUMMARY

In one embodiment, a tire is provided, the tire comprising: a tread portion comprising at least one groove having a groove base, wherein the groove base comprises at least one cross-groove negative geometry.

In another embodiment, a tire is provided, the tire comprising: a tread portion comprising at least one groove, wherein the groove comprises at least one cross-groove negative geometry extending radially inwardly from the groove.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

A tire's engagement with a road surface is its means for providing traction to the vehicle upon which it is mounted. A tire configured to only operate on relatively smooth, dry surfaces, such as a race track, typically comprises a "slick" or non-patterned design configured to provide maximum engagement between the tire and the driving surface. However, such tires perform poorly when exposed to wet driving surfaces and are prone to hydroplaning. Accordingly, tires are regularly designed to optimize performance across a range of dry and wet operating conditions.

Tires designed to perform best in dry/wet conditions are not necessarily optimized for winter snow/ice conditions. Tires optimized for dry/wet conditions typically include a series of ribs for contacting the driving surface, and a series of grooves for channeling and evacuating water to avoid hydroplaning. Tires optimized for snow/ice conditions typically include tread blocks having an abundance of siping or other cross-groove negative geometry, wherein each sipe creates one or more edge, in addition to the edges of the tread block, configured to provide maximum traction between the tire and the snow or ice.

In addition to the physical features of a tire tread pattern that contribute to optimization of a tire for dry/wet or snow/ice performance, tread compounds can be selected to increase traction in specific operating conditions. For example, a tire may be designed with a high dry grip and high wet grip tread compound in its rib areas, wherein the compound is configured to provide the greatest traction between the tire and the driving surface in dry/wet conditions.

Some tires are configured to provide acceptable performance in dry/wet conditions as well as snow/ice conditions. These tires are typically referred to as "all-season" tires. These all-season tires typically do not perform as well in dry/wet conditions as a tire optimized for dry/wet performance, and do not perform as well in snow/ice conditions as a tire optimized for snow/ice performance. Rather, these tires attempt to provide the best possible performance while recognizing that optimization across a wide range of operating conditions requires a compromise in tire performance.

Figure 1:
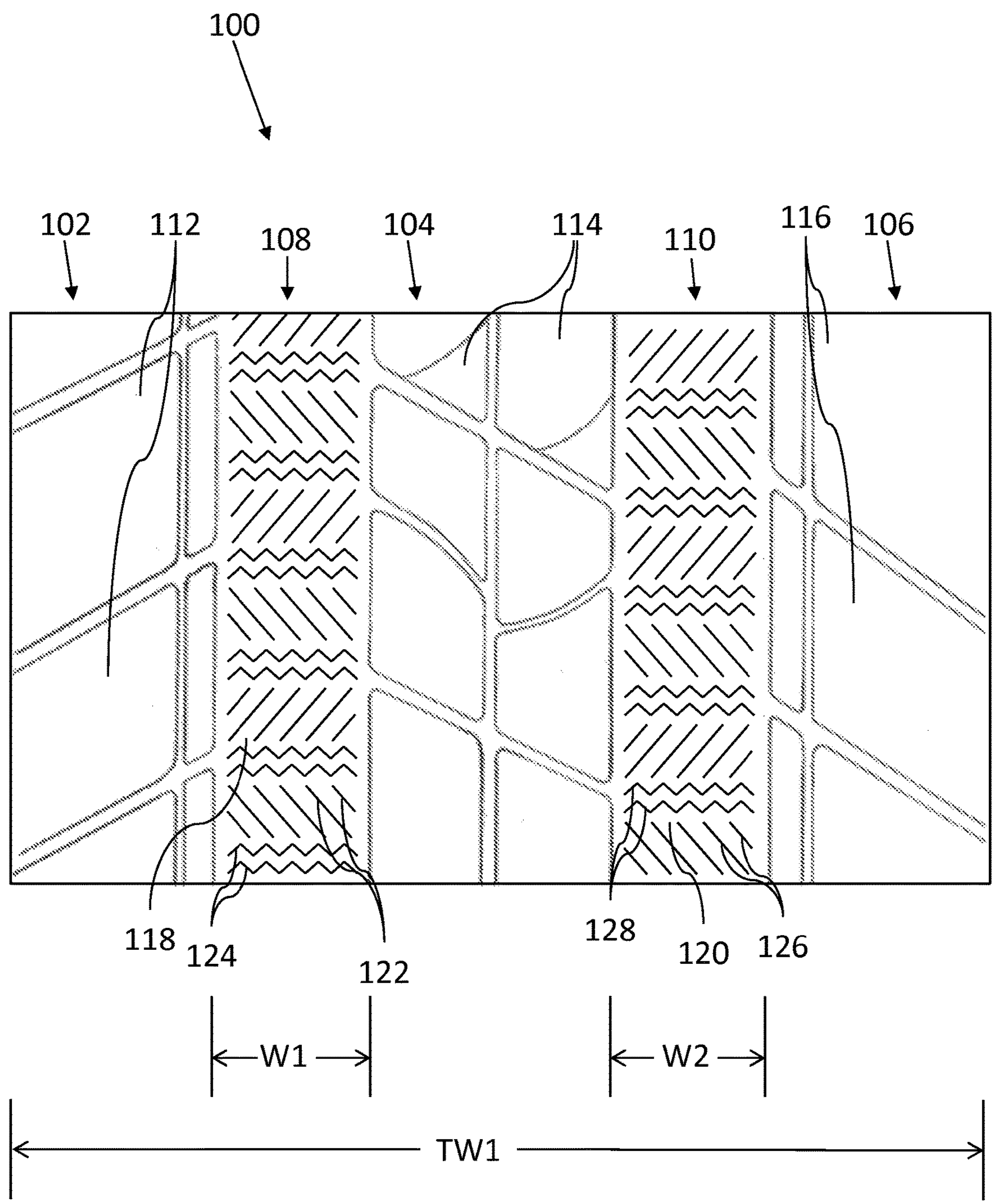
FIG. 1 illustrates a top elevational view of an example embodiment of a tire having grooves comprising a cross-groove negative geometry.

FIG. 1 illustrates an example embodiment of a tire comprising a tread portion 100. In one embodiment, the tire is a pneumatic tire. In another embodiment, the tire is a passenger tire. Tread portion 100 may comprise at least one rib, such as ribs 102, 104, and 106. Tread portion 100 may additionally include at least one groove, such as grooves 108 and 110.

In one embodiment, at least one of ribs 102, 104, and 106 comprise a plurality of individual tread blocks, including blocks 112, 114, and 116, respectively. In another embodiment, at least one of ribs 102, 104, and 106 comprise continuous ribs extending circumferentially about the tire.

In one embodiment, at least one of ribs 102, 104, and 106 comprise at least one of a high dry grip tread compound and a high wet grip tread compound. In another embodiment, at least one of ribs 102, 104, and 106 comprise any of a variety of tread compounds, including for example compounds configured for grip, compounds configured for wear, and the like.

In one embodiment, tread portion 100 may comprise any of a variety of tread compounds, including for example compounds configured for grip, compounds configured for wear, and the like. In another embodiment, tread portion 100 may comprise any compound to which it is desirable to add increased snow and/or ice traction.

In one embodiment, grooves 108 and 110 comprise a groove base 118 and 120, respectively. In one embodiment, groove 108 comprises at least one cross-groove negative geometry 122 and 124. In one embodiment, at least one cross-groove negative geometry 122 comprises a substantially straight sipe. In another embodiment, at least one cross-groove negative geometry 122 comprises any of a variety of sipe configurations, including for example: a straight sipe, a curved sipe, or an angled sipe.

In one embodiment, at least one cross-groove negative geometry 122 comprises sipes oriented substantially parallel to one another. In another embodiment, at least one cross-groove negative geometry 122 is oriented at any angle relative to the axial axis of the tire. In another embodiment, at least one cross-groove negative geometry 122 is oriented substantially parallel to the axial axis of the tire. In another embodiment, at least one cross-groove negative geometry 122 is oriented substantially perpendicular to the axial axis of the tire. In one embodiment, a first series of at least one cross-groove negative geometry 122 includes a plurality of sipes oriented substantially parallel to one another and angled in a first direction, and a second series of at least one cross-groove negative geometry 122 includes a plurality of sipes oriented substantially parallel to one another and angled in a second direction. In one embodiment, a plurality of cross-groove negative geometries 122 are oriented adjacent one another in a substantially non-parallel configuration. Groove 110 may comprise at least one cross-groove negative geometry 126 oriented in the same or similar manner as at least one cross-groove negative geometry 122.

In one embodiment, at least one cross-groove negative geometry 124 comprises a zigzag sipe. In one embodiment, tread portion 100 comprises grooves 108 and 110 comprising a plurality of cross-groove negative geometries 124 and 128, respectively, in a zigzag configuration oriented adjacent one another. In one embodiment, at least one cross-groove negative geometry 124 comprises a zigzag sipe extending in a substantially axial direction along tread portion 100. In another embodiment, at least one cross-groove negative geometry 124 comprises a zigzag sipe extending in any of a variety of directions along tread portion 100, including for example: along an axial axis, along a longitudinal axis, or angled relative to an axial axis. At least one cross-groove negative geometry 128 may be oriented in the same or similar manner as at least one cross-groove negative geometry 124.

In one embodiment, cross-groove negative geometries 122, 124, 126, and 128 extend radially inwardly from groove bases 118 and 120.

In one embodiment, cross-groove negative geometries 122, 124, 126, and 128 comprise any of a variety of elements, including combinations of different elements, in any of a variety of patterns, including for example: a sipe, a zigzag sipe, a curved sipe, interlocking sipes, intersecting sipes, a notch, a slot, a void, or a texture with negative geometry. Negative geometry is understood to include any element extending radially inwardly from a groove base. Any pattern of cross-groove negative geometries 122, 124, 126, and 128 that are configured to provide increased traction upon snow and/or ice may be used.

In one embodiment, a sipe in tread portion 100 is formed by inserting an element into a tread mold. In another embodiment, a sipe in tread portion 100 comprises a width of about 0.75 mm.

In one embodiment, a slot in tread portion 100 is formed by a raised portion in a tread mold. In another embodiment, a slot in tread portion 100 comprises a width greater than about 0.75 mm.

In one embodiment, a texture includes any texture configured to provide increased traction upon snow and/or ice.

In one embodiment, tread portion 100 comprises ribs 102, 104, and 106 optimized for dry/wet conditions, grooves 108 and 110 having a depth configured to sufficiently channel and evacuate water, and cross-groove negative geometries 122, 124, 126, and 128 within grooves 108 and 110 to create traction with snow and/or ice. In one embodiment, during operation in snow/ice conditions, ribs 102, 104, and 106 dig into the snow/ice, thus exposing cross-groove negative geometries 122, 124, 126, and 128 within grooves 108 and 110 to the snow/ice. At least one of cross-groove negative geometries 122, 124, 126, and 128 within grooves 108 and 110 may engage the snow/ice and create traction between tread portion 100 and the snow/ice. In one embodiment, at least one of cross-groove negative geometries 122, 124, 126, and 128 within grooves 108 and 110 may comprise an edge configured to engage the snow/ice and create traction between tread portion 100 and the snow/ice.

Tread portion 100 may comprise a tread width TW1. Tread width TW1 may represent the total width of tread portion 100. Groove 108 may comprise a groove width W1. Groove 110 may comprise a groove width W2.

In one embodiment, tread portion 100 comprises a groove-rib ratio. The groove-rib ratio may be calculated by: (1) adding the widths of each groove (for example, W1 and W2) to obtain a total groove width; (2) subtracting the total groove width from the tread width TW1 to obtain a total rib width; and (3) dividing the total groove width by the total rib width.

In one embodiment, tread portion 100 comprises a higher than average (compared to similar tires) groove-rib ratio. Increased groove-rib ratio results in more area in the at least one groove (for example, 108 and 110) of tread portion 100. Increased groove area may result in increased traction between tread portion 100 and snow when tread portion 100 is exposed to snow/ice.

Tread portion 100 may comprise any distribution of rib versus groove. Tread portion 100 may comprise ribs and grooves of any of a variety of widths.

In another embodiment, tread portion 100 comprises a lower than average (compared to similar tires) groove-rib ratio. In another embodiment, tread portion 100 comprises an average (compared to similar tires) groove-rib ratio.

While FIG. 1 illustrates a tread portion 100 comprising three ribs (102, 104, and 106) and two grooves (108 and 110), it is contemplated that any number of grooves or ribs could be utilized in connection with this design. Similarly, it is contemplated that this design could be applied to any of a variety of tread patterns utilized in tires, including all-season patterns, summer patterns, winter patterns, and the like. Additionally, it is contemplated that this design could be applied to any of a variety of tire types, including passenger tires, truck tires, bus tires, off-the-road tires, agricultural tires, and the like.

Figure 2:
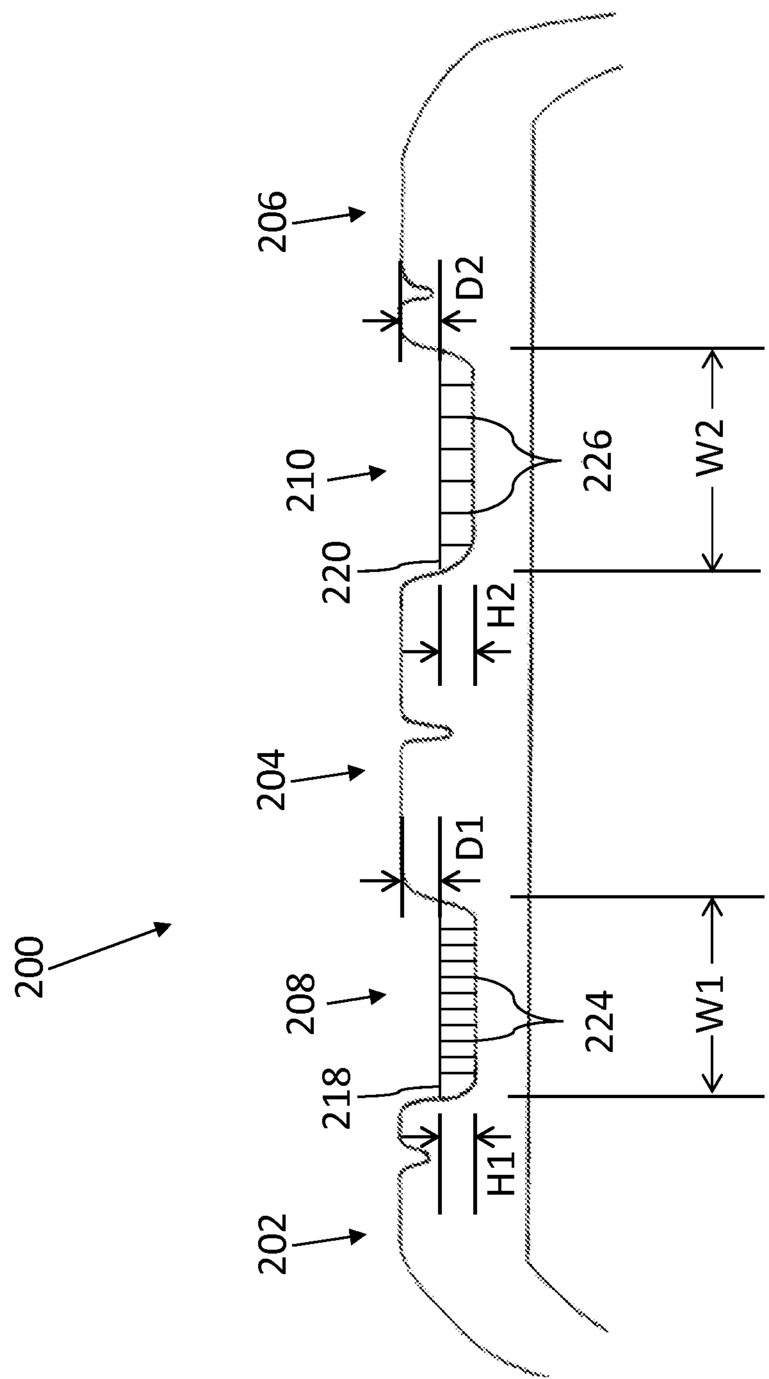
FIG. 2 illustrates a cross-sectional view of an example embodiment of a tire having grooves comprising a cross-groove negative geometry.

FIG. 2 illustrates a cross-sectional view of an example embodiment of a tire comprising a tread portion 200. Tread portion 200 may comprise at least one rib 202, 204, and 206. Tread portion 200 may additionally comprise at least one groove 208 and 210.

In one embodiment, groove 208 comprises a groove base 218. In another embodiment, groove 210 comprises a groove base 220. In one embodiment, groove 208 comprises at least one cross-groove negative geometry 224. In another embodiment, groove 210 comprises at least one cross-groove negative geometry 226. As illustrated in FIG. 2, at least one cross-groove negative geometries 224 and 226 extend radially inwardly from groove bases 218 and 220.

In one embodiment, at least one cross-groove negative geometry 224 extends radially inwardly from groove base 218. At least one cross-groove negative geometry 224 may extend radially inwardly to a depth of H1. In one embodiment, at least one cross-groove negative geometry 226 extends radially inwardly from groove base 220. At least one cross-groove negative geometry 226 may extend radially inwardly to a depth of H2.

In one embodiment, at least one groove 208 comprises a depth D1, which is measured from the radially outward-most portion of ribs 202 and 204 to groove base 218. In one embodiment, at least one groove 210 comprises a depth D2, which is measured from the radially outward-most portion of ribs 204 and 206 to groove base 220.

In one embodiment, depth D1 and depth D2 comprise about an average tread depth (compared to similar tires). In another embodiment, depth D1 and depth D2 comprise a depth sufficient for channeling and evacuation of water within grooves 208 and 210. In another embodiment, depth D1 and depth D2 comprise a depth configured to increase tread height, thus leading to increased tread life.

In one embodiment, groove 208 comprises a cross-sectional area defined by multiplying depth D1 and groove width W1. In one embodiment, groove 208's cross-sectional area is about an average groove cross-sectional area (compared to similar tires). Groove 208's cross-sectional area may be adjusted by varying depth D1 and/or groove width W1.

In one embodiment, groove 210 comprises a cross-sectional area defined by multiplying depth D2 and groove width W2. In one embodiment, groove 210's cross-sectional area is about an average groove cross-sectional area (compared to similar tires). Groove 210's cross-sectional area may be adjusted by varying depth D2 and/or groove width W2.

In one embodiment, tread portion 200 comprises an M-gauge value measured from the groove bases 218 and 220 radially inward to the radially outward-most reinforcing layer. In one embodiment, the M-gauge value in tread portion 200 is greater than a comparable tire, so as to accommodate cross-groove negative geometries 224 and 226.

Figure 3:
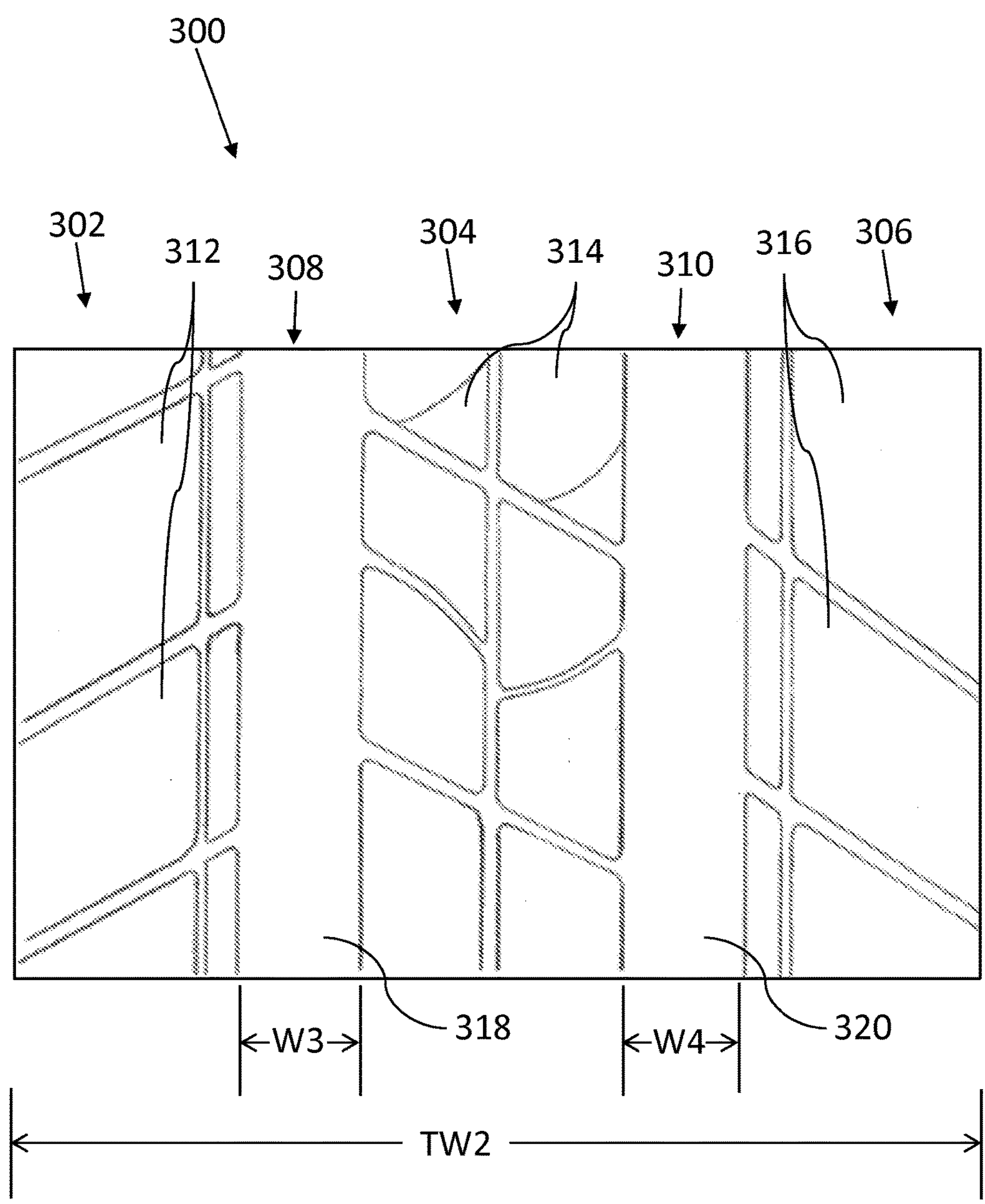
FIG. 3 illustrates a top elevational view of an example embodiment of a prior art tire.

FIG. 3 illustrates an example embodiment of a prior art tire comprising a tread portion 300. Tread portion 300 comprises at least one rib 302, 304, and 306, and at least one groove 308 and 310.

Ribs 302, 304, and 306 comprise tread blocks 312, 314, and 316, respectively.

Groove 308 comprises a groove base 318 and a width W3. Groove 310 comprises a groove base 320 and a width W4. Tread portion 300 comprises a tread width TW2.

Tread portion 300 comprises a groove-rib ratio less than that of tread portion 100.

Figure 4:
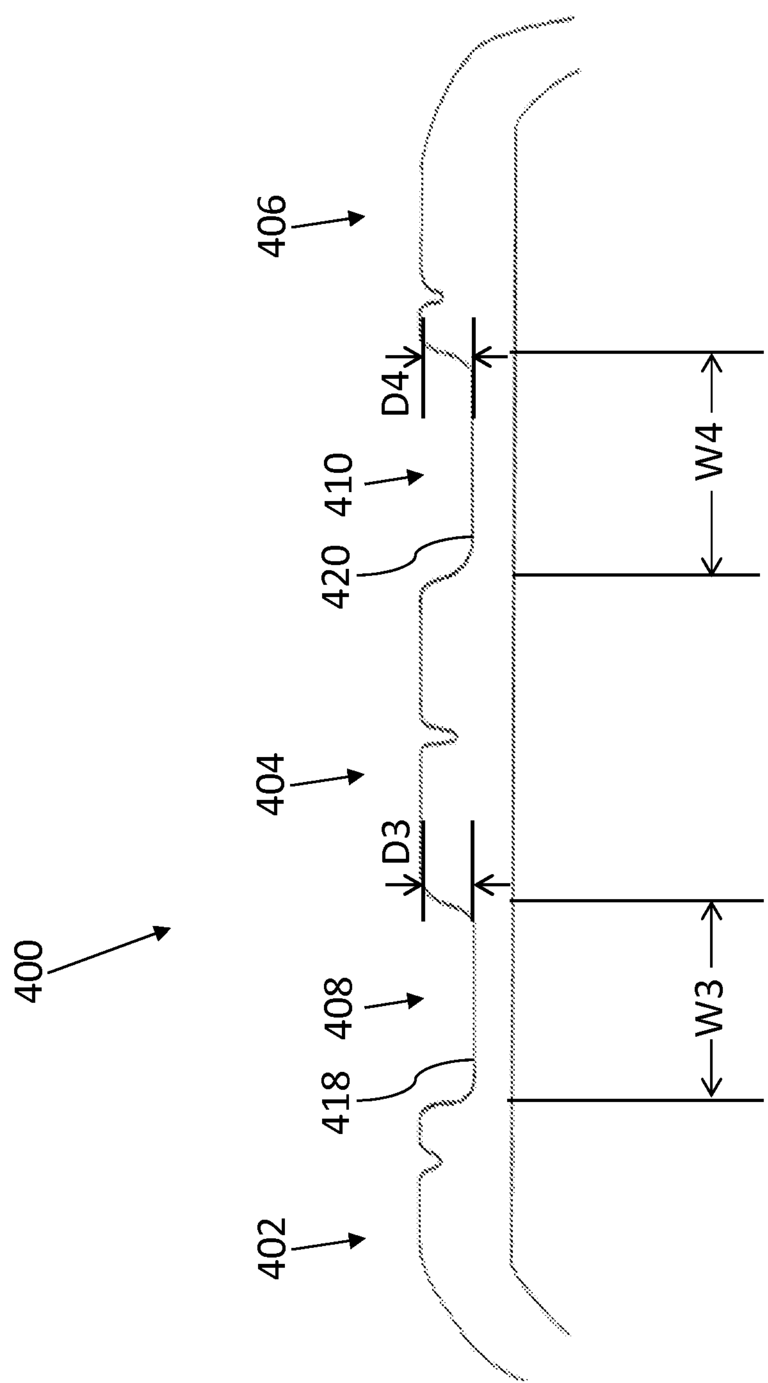
FIG. 4 illustrates a cross-sectional view of an example embodiment of a prior art tire.

FIG. 4 illustrates an example embodiment of a prior art tire comprising a tread portion 400. Tread portion 400 comprises at least one rib 402, 404, and 406, and at least one groove 408 and 410.

Groove 408 comprises a groove base 418 and a depth D3. Groove 410 comprises a groove base 420 and a depth D4.

In one embodiment, D1 and D2 as illustrated in FIG. 2 are substantially equal to D3 and D4. In another embodiment, D1 and D2 as illustrated in FIG. 2 are less than D3 and D4. In another embodiment, D1 and D2 as illustrated in FIG. 2 are greater than D3 and D4.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A tire, comprising:

a tread portion comprising at least one groove having a groove base, wherein the groove base comprises at least one cross-groove negative geometry comprising:

a plurality of a first type of cross-groove negative geometries configured as a group and separated by a predetermined distance; and a plurality of a second type of cross-groove negative geometries configured as a group and separated by a predetermined distance, wherein the group of the first type of cross-groove negative geometries and the group of the second type of cross-groove negative geometries are provided alternately in a circumferential direction of the tire in the same groove, and separated by a predetermined distance.

2. The tire of claim 1, wherein the first type of cross-groove negative geometries is a zigzag sipe.

3. The tire of claim 2, wherein the plurality of the zigzag sipes extends in any of a variety of directions along the tread portion.

4. The tire of claim 1, wherein the second type of cross-groove negative geometries is a straight sipe.

5. The tire of claim 4, wherein the plurality of straight sipes is oriented substantially parallel to one another and perpendicular to an axial axis of the tire.

6. The tire of claim 4, wherein the plurality of the straight sipes is oriented substantially parallel to one another and angled relative to an axial axis of the tire.

7. The tire of claim 4, wherein the plurality of straight sipes is oriented in a substantially non-parallel configuration relative to one another.

8. The tire of claim 1, wherein the orientation of the plurality of the first cross-groove negative geometries and the orientation of the second cross-groove negative geometries differ between the grooves of the tire.

9. The tire of claim 1, wherein the tread portion comprises at least one rib, and wherein the at least one rib comprises at least one of a dry grip tread compound and a wet grip tread compound.

10. A tire, comprising:

a tread portion comprising at least one groove having a groove base, wherein the groove comprises at least one cross-groove negative geometry comprising:

a plurality of zigzag sipes configured in a group, wherein the plurality of zigzag sipes geometries is separated by a predetermined distance;

a plurality of straight sipes configured in a group, wherein the plurality of the straight sipes is separated by a predetermined distance;

wherein the group of the zigzag sipes and the group of the straight sipes are provided alternately in the same groove and separated by a predetermined distance.

11. The tire of claim 10, wherein the plurality of the zigzag sipes extends in any of a variety of directions along the tread portion.

12. The tire of claim 10, wherein the plurality of the straight sipes is oriented substantially parallel to one another and perpendicular to an axial axis of the tire.

13. The tire of claim 10, wherein the plurality of the straight sipes is oriented substantially parallel to one another and angled relative an axial axis of the tire.

14. The tire of claim 10, wherein the plurality of the straight sipes is oriented in a substantially non-parallel configuration relative to one another.

15. The tire of claim 10, wherein the orientation of the plurality of the zigzag and straight sipes differs between grooves.

16. The tire of claim 10, wherein the tread portion comprises at least one rib, and wherein the at least one rib comprises at least one of a dry grip tread compound and a wet grip tread compound.

* * * * *